(12) United States Patent
Toujima et al.

(10) Patent No.: US 6,188,440 B1
(45) Date of Patent: Feb. 13, 2001

(54) IMAGE PROCESSOR

(75) Inventors: Masayoshi Toujima, Fukuoka; Hiromasa Nakajima, Kanagawa; Yasuo Kohashi; Hitoshi Fujimoto, both of Fukuoka; Misako Matsumoto, Tokyo, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/090,984

(22) Filed: Jun. 5, 1998

(30) Foreign Application Priority Data

Jun. 6, 1997 (JP) .................................................. 9-148907
Jul. 15, 1997 (JP) .................................................. 9-189805

(51) Int. Cl.[7] .............................. H04N 7/14; H04N 5/04; H04N 3/27; H04N 5/14; H04N 1/00
(52) U.S. Cl. .......................... 348/554; 348/571; 348/714; 348/500; 348/14; 348/17; 358/404; 358/405
(58) Field of Search ..................................... 348/554, 571, 348/714, 500, 14, 15, 17, 572; 358/404, 405

(56) References Cited

U.S. PATENT DOCUMENTS

| 4,800,431 | 1/1989 | Deering . | |
|---|---|---|---|
| 5,438,376 | * 8/1995 | Watanabe | 348/714 |
| 5,485,283 | * 1/1996 | Kaneko | 358/518 |
| 5,519,499 | * 5/1996 | Saito | 358/296 |
| 5,680,175 | * 10/1997 | Yanai et al. | 348/441 |
| 5,805,300 | * 9/1998 | Fukushima | 358/404 |
| 5,896,203 | * 4/1999 | Shibata | 358/404 |
| 5,999,214 | * 12/1999 | Inagaki | 348/211 |

FOREIGN PATENT DOCUMENTS

| 01157136 | 6/1989 | (JP) . |
| 4-326690 | 11/1992 | (JP) . |
| 5-308622 | 11/1993 | (JP) . |
| 6-178149 | 6/1994 | (JP) . |
| 6-189285 | 7/1994 | (JP) . |
| 8-214313 | 8/1996 | (JP) . |
| 8-275152 | 10/1996 | (JP) . |

* cited by examiner

Primary Examiner—John K. Peng
Assistant Examiner—Paulos Natnael
(74) Attorney, Agent, or Firm—McDermott, Will & Emery (57) ABSTRACT

A conversion unit having a bidirectional conversion function of converting analog video signals into digital image data and vice versa and a processing unit having a function of encoding image data and of decoding encoded data are provided. A data transmission control unit switches the flow direction of each of image data and encoded data in response to an encoder/decoder switch signal. A process control unit performs switching of the receiving/transmitting of a control signal such as a transmission clock signal relating to encoded data in response to a master/slave set signal.

12 Claims, 11 Drawing Sheets

IMAGE PROCESSOR

BACKGROUND OF THE INVENTION

This invention relates to an image processor.

Transmissions via communications lines in video conference and in video telephone are slow, and transmission of a tremendous volume of image data requires the process of encoding. ITU-T (International Telecommunication Union—Telecommunication Standardization Sector) Recommendations H.261 and H.263 are known as adoptable encoding methods. These recommendations specify CIF (Common Intermediate Format) and QCIF (Quarter CIF). Whereas a CIF picture is composed of 352×288 pixels, a QCIF picture is composed of 176×144 pixels. The use of BCH (Bose-Chaudhuri-Hocquenghem Code) error correcting codes in sending and receiving encoded data is also specified in these recommendations. In addition, other encoding methods named after the experts groups of ISO (International Organization for Standardization) have been known, and these encoding methods are JPEG (Joint Photographic Coding Experts Group) which is the international standard for color non-moving picture compression and MPEG (Moving Picture Experts Group) which is the international standard for multimedia moving picture compression.

Encoded data, produced by the process of encoding, are converted into analog video signals by the process of decoding. Conventionally, encoders for image encoding have been prepared independently of decoders for image decoding.

Because of such separate preparation, the design cost increases twofold, therefore increasing the cost of image processing systems. Another problem is that it becomes impossible to make an image processor adaptable to a large number of applications.

SUMMARY OF THE INVENTION

An object of the present invention is to provide an image processor capable of performing a plurality of functions with a single piece of hardware.

In order to achieve the object, the present invention provides a novel image processor. More specifically, the flow direction of data is switched while sharing the greatest possible hardware resource between the process of encoding and the process of decoding, in order to make the image processor of the present invention operable as an encoder or decoder.

Additionally, the functions of sending and receiving transmission clock signals are switched such that the image processor of the present invention can operate as a slave device which receives a transmission clock signal from an external device or as a master device which itself transmits a transmission clock signal for synchronous transmission of encoded data.

The present invention can provide (i) a slave encoder's function to transmit encoded data synchronously with a transmission clock signal received from a system controller in charge of controlling the entire image processing system, (ii) a mater encoder's function to transmit to a decoder a transmission clock signal along with encoded data in the absence of a system controller, (iii) a slave decoder's function to receive encoded data sent from an encoder and a transmission clock signal, and (iv) a master decoder's function to transmit a transmission clock signal so that the encoder can output encoded data synchronously therewith. Additionally, switching between the functions of sending and receiving a timing signal indicative of the start or stop of an encoding process can be made.

BRIEF DESCRIPTION OF THE DRAWINGS

FIG. 6, comprised of 6A and 6B, is a diagram describing the internal connection of a line number converter as illustrated in FIG. 5, FIGS. 6A and 6B showing an encoder configuration and a decoder configuration respectively.

FIG. 9 is a timing chart diagram showing the operation of second memories as illustrated in FIGS. 6A and 6B in cases where CIF pictures are dealt with.

FIG. 10 is a timing chart diagram showing the operation of the second memories as illustrated in FIGS. 6A and 6B in cases where QCIF pictures are dealt with.

DETAILED DESCRIPTION OF THE INVENTION

Figure 1:
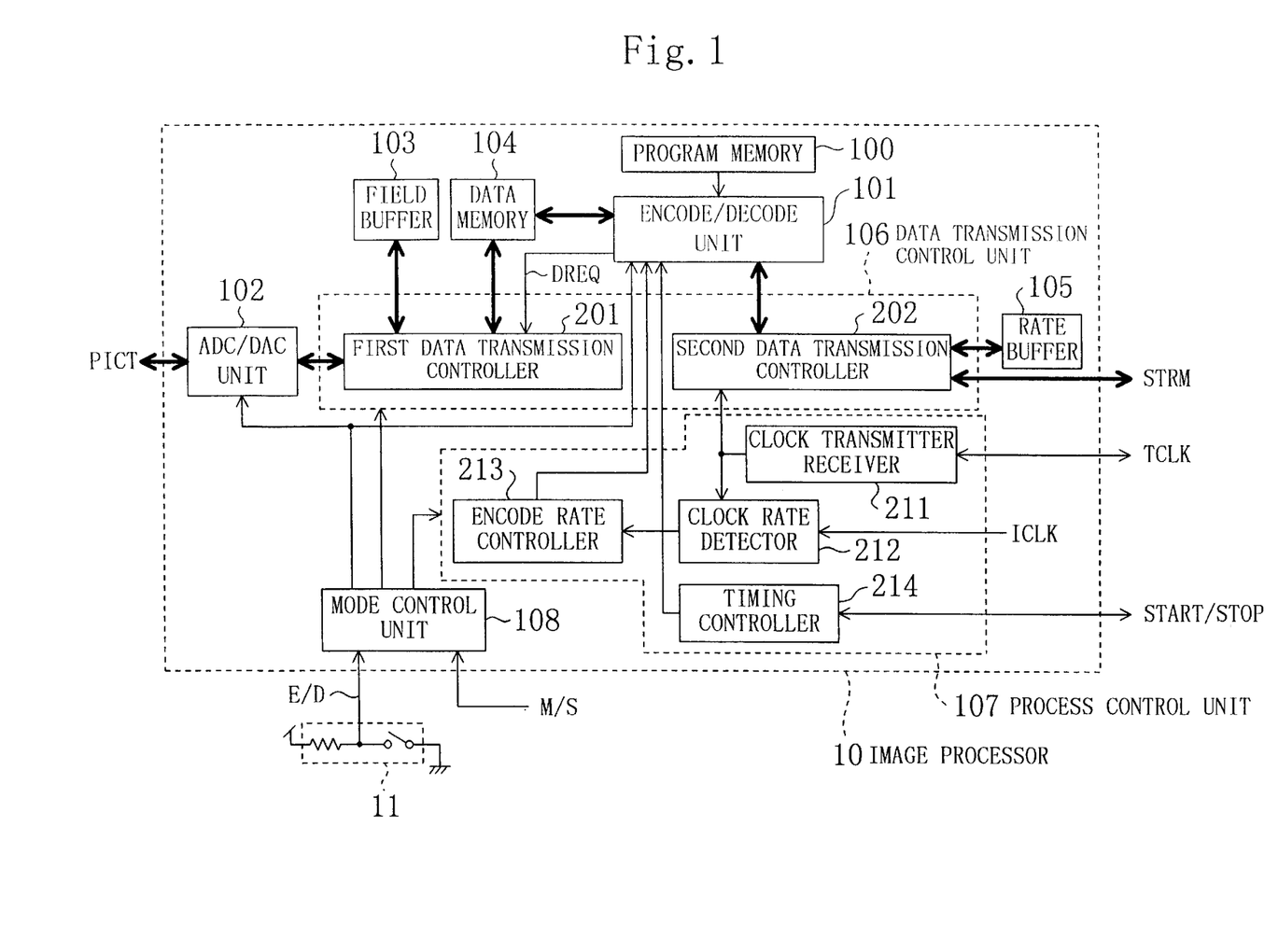
FIG. 1 is a block diagram showing an example of the structure of an image processor in accordance with the present invention.

FIG. 1 shows an exemplary structure of an image processor in accordance with the present invention. Referring to FIG. 1, an image processor 10 of the present invention, which is operable as an encoder for the process of image encoding or decoder for the process of image decoding, has a program memory 100, a processing unit 101, an ADC/DAC (analog-to-digital conversion/digital-to-analog conversion) unit 102 (hereinafter called the conversion unit 102), a first buffer memory 103, a data memory 104, a second buffer memory 105, a data transmission control unit 106, a process control unit 107, and a mode control unit 108.

The program memory 100 determines the method of encoding to be carried out by the image processor 10 and stores image encoding and decoding programs.

The conversion unit 102 has a function of converting a given analog video signal (VIDEO SIGNAL PICT) into digital image data and of converting digital image data into VIDEO SIGNAL PICT.

The first buffer memory 103 is a field buffer for temporarily holding either 1-field digital image data produced by the process of A/D conversion by the conversion unit 102 or 1-field digital image data to be D/A converted by the conversion unit 102. The first buffer memory 103 can be constructed of, for example, a SRAM (static random access memory).

The data memory 104 is a device for storing either image data to be encoded or image data that was produced by the process of decoding. The data memory 104 can be constructed of, for example, a DRAM (dynamic random access memory).

The processing unit 101 is an encode/decode unit that has a processor for processing image data by the use of a program downloaded from the program memory 100. The processing unit 101 has a function of reading image data from the data memory 104 and of encoding the image data, and a function of decoding given encoded data and of writing image data produced by the decoding process into the data memory 104.

The second buffer memory 105 is a rate buffer for temporarily holding either encoded data produced by the process of encoding by the processing unit 101 or encoded data supplied from outside. The second buffer memory 105 can be constructed of, for example, a SRAM.

The data transmission control unit 106 comprises a first data transmission controller 201 and a second data transmission controller 202. The first data transmission controller 201 controls the transmission of image data between the conversion unit 102 and the first buffer memory 103 and the transmission of image data between the first buffer memory 103 and the data memory 104. Referring to FIG. 1, DREQ represents a data transmission request signal that is issued from the processing unit 101 to the first data transmission controller 201. REQUEST SIGNAL DREQ conveys a request for transmission of new image data. The second data transmission controller 202 controls the transmission of encoded data between the processing unit 101 and the second buffer memory 105 and the input/output of encoded data of the second buffer memory 105 in the form of a stream of bits (hereinafter called BITSTREAM STRM).

The process control unit 107 comprises a clock transmitter-receiver 211, a clock rate detector 212, an encode rate controller 213, and a timing controller 214. Referring to FIG. 1, TCLK represents a transmission clock signal. The clock transmitter-receiver 211 has (i) a master function of sending CLOCK SIGNAL TCLK so that an external device can input BITSTREAM STRM output from the rate buffer 105 synchronously with the sent clock signal (TCLK) when the image processor 10 becomes an encoder and of sending CLOCK SIGNAL TCLK so that an external device can output BITSTREAM STRM to be entered into the rate buffer 105 synchronously with the sent clock signal (TCLK) when the image processor 10 becomes a decoder and (ii) a slave function of receiving CLOCK SIGNAL TCLK from an external device and of sending the received clock signal (TCLK) to the second data transmission controller 202 so that the input and output operations of BITSTREAM STRM can be carried out synchronously with the received clock signal (TCLK). The clock rate detector 212 detects the frequency of CLOCK SIGNAL TCLK, that was received by the clock transmitter-receiver 211, by the use of an internal clock signal ICLK of the image processor 10. According to a frequency of the CLOCK SIGNAL TCLK detected by the clock rate detector 212, the encode rate controller 213 controls the amount of encoded data that are produced by the encoding process in the processing unit 101. Referring to FIG. 1, START/STOP represents a timing signal. The timing controller 214 has (i) a transmitting function of sending TIMING SIGNAL START/STOP in order to inform an external device of the start or stop of an encoding process in the processing unit 101 when the image processor 10 becomes an encoder and of sending TIMING SIGNAL START/STOP in order to cause an external device to start or stop an encoding process when the image processor 10 becomes a decoder and (ii) a receiving function of receiving TIMING SIGNAL START/STOP from an external device and of sending the received timing signal (START/STOP) to the processing unit 101 in order to cause the processing unit 101 to start or stop an encoding or decoding process.

In response to an encoder/decoder switch signal E/D from a switch circuit 11, the mode control unit 108 changes the configuration of the data transmission control unit 106 in order to switch the flow direction of image data and that of encoded data and designates the functions of the processing unit 101 and conversion unit 102. In addition to these functions, the mode control unit 108 also has a function to change the configuration of the process control unit 107 in order to switch the function of the process control unit 107 in response to a master/slave set signal M/S. For example, if E/D=HIGH and M/S=HIGH, then a master encoder configuration is chosen. If E/D=HIGH and M/S=LOW, then a slave encoder configuration is chosen. If E/D=LOW and M/S=HIGH, then a master decoder configuration is chosen. If E/D=LOW and M/S=LOW, then a slave decoder configuration is chosen.

Firstly, the operation of the image processor 10 when a master encoder configuration is chosen is described. A program for use in image encoding is downloaded from the program memory 100 to the processing unit 101. The timing controller 214 signals the processing unit 101 to start an encoding process and sends TIMING SIGNAL START conveying the information that the encoding process has started in the processing unit 101. The conversion unit 102 receives an analog video signal (VIDEO SIGNAL PICT) and converts the received analog video signal into digital image data. The first data transmission controller 201 periodically takes in image data digitalized by the conversion unit 102 and writes the taken-in digitalized image data into the field buffer 103. Upon the receipt of REQUEST SIGNAL DREQ from the processing unit 101, the first data transmission controller 201 performs a high-speed transmission of image data from the field buffer 103 to the data memory 104 provided that a specified amount of image data (i.e., 1-field image data) has already been stored in the field buffer 103. The processing unit 101 reads image data from the data memory 104 and encodes the image data. Encoded data, produced by encoding, is written by the second data transmission controller 202 into the rate buffer 105. Further, the second data transmission controller 202 reads encoded data from the rate buffer 105 and outputs the encoded data in the form of BITSTREAM STRM. The clock transmitter-receiver 211 sends CLOCK SIGNAL TCLK in synchronization with BITSTREAM STRM. By the foregoing master encode operation, BITSTREAM STRM in synchronization with CLOCK SIGNAL TCLK sent from the image processor 10 can be obtained. The timing controller 214 signals the processing unit 101 to stop the encoding process and sends TIMING SIGNAL STOP indicating that the encoding process in the processing unit 101 has been brought into a stop.

Secondly, the operation of the image processor 10 when a slave encoder configuration is chosen is described. Upon the receipt of TIMING SIGNAL START conveying a request for the start of an encoding process, the timing controller 214 passes the received timing signal to the processing unit 101 so that the processing unit 101 can start the encoding process. Data are transmitted from the conversion unit 102 to the rate buffer 105 along the same data transmission path as in the master encoder configuration. The clock transmitter-receiver 211 receives CLOCK SIG- NAL TCLK supplied from outside for forwarding to the second data transmission controller 202. The second data transmission controller 202 reads encoded data from the rate buffer 105 and outputs the encoded data in the form of BITSTREAM STRM synchronously with CLOCK SIGNAL TCLK received by the clock transmitter-receiver 211. The clock rate detector 212 detects the frequency of CLOCK SIGNAL TCLK, that was received by the clock transmitter-receiver 211, by the use of CLOCK SIGNAL ICLK of the image processor 10. According to a frequency of the CLOCK SIGNAL TCLK detected by the clock rate detector 212, the encode rate controller 213 controls the amount of encoded data that are produced by the encoding process in the processing unit 101. Owing to the foregoing slave encode operation, BITSTREAM STRM in synchronization with CLOCK SIGNAL TCLK applied to the image processor 10 can be obtained. Upon the receipt of TIMING SIGNAL STOP conveying a request for the stop of the encoding process, the timing controller 214 passes the received timing signal to the processing unit 101 so that the encoding process in the processing unit 101 can be brought into a stop.

Thirdly, the operation of the image processor 10 when a slave decoder configuration is chosen is described. A program used for image decoding is downloaded from the program memory 100 to the processing unit 101. Upon the receipt of TIMING SIGNAL START indicating that an encoding process has been started, the timing controller 214 passes the received timing signal to the processing unit 101 so that the processing unit 101 can start a decoding process. The clock transmitter-receiver 211 receives CLOCK SIGNAL TCLK supplied from outside and provides the received transmission clock signal to the second data transmission controller 202. The second data transmission controller 202 inputs BITSTREAM STRM supplied from outside synchronously with CLOCK SIGNAL TCLK received by the clock transmitter-receiver 211 and writes the input bitstream (STRM) into the rate buffer 105 as encoded data. Further, in response to a request made by the processing unit 101, the second data transmission controller 202 performs a transmission of encoded data stored in the rate buffer 105 to the processing unit 101. The processing unit 101 performs a decoding process on the encoded data supplied from the rate buffer 104 and writes image data produced by the decoding process into the data memory 104. Further, the processing unit 101 applies REQUEST SIGNAL DREQ to the first data transmission controller 201. Upon the receipt of REQUEST SIGNAL DREQ from the processing unit 101, the first data transmission controller 201 carries out a high-speed transmission of image data from the data memory 104 to the field buffer 103. Further, the first data transmission controller 201 periodically reads image data from the field buffer 103 and provides the image data to the conversion unit 102. The conversion unit 102 performs a conversion of the supplied digital image data into VIDEO SIGNAL PICT and provides the video signal (PICT). Owing to the foregoing slave decode operation, VIDEO SIGNAL PICT in synchronization with CLOCK SIGNAL TCLK applied to the image processor 10 can be obtained. Upon the receipt of TIMING SIGNAL STOP indicative of the stop of the encoding process, the timing controller 214 sends the received timing signal to the processing unit 101 so that the decoding process in the processing unit 101 can be stopped.

Finally, the operation of the image processor 10 when a master decoder configuration is chosen is described. The timing controller 214 sends to the encoder TIMING SIGNAL START conveying a request for the start of an encoding process and signals the processing unit 101 to start a decoding process. The clock transmitter-receiver 211 sends CLOCK SIGNAL TCLK so that BITSTREAM STRM to be entered into the rate buffer 105 can be output to the encoder synchronously with the sent clock signal (TCLK). Data are transmitted from the rate buffer 105 to the conversion unit 102 along the same data transmission path as in the slave decoder configuration. Owing to the foregoing master decode operation, VIDEO SIGNAL PICT in synchronization with CLOCK SIGNAL TCLK sent from the image processor 10 can be obtained. In order to stop the encoding process, the timing controller 214 sends TIMING SIGNAL STOP conveying a request for the stop of the encoding process and signals the processing unit 101 to stop the decoding process.

Referring to FIG. 1, four different types of processing can be achieved with a single system by changing the properties of some circuits of the entire system in response to an external signal, therefore making the system adaptable to a large number of applications. Additionally, reductions in the number of components required can be achieved.

Figure 2:
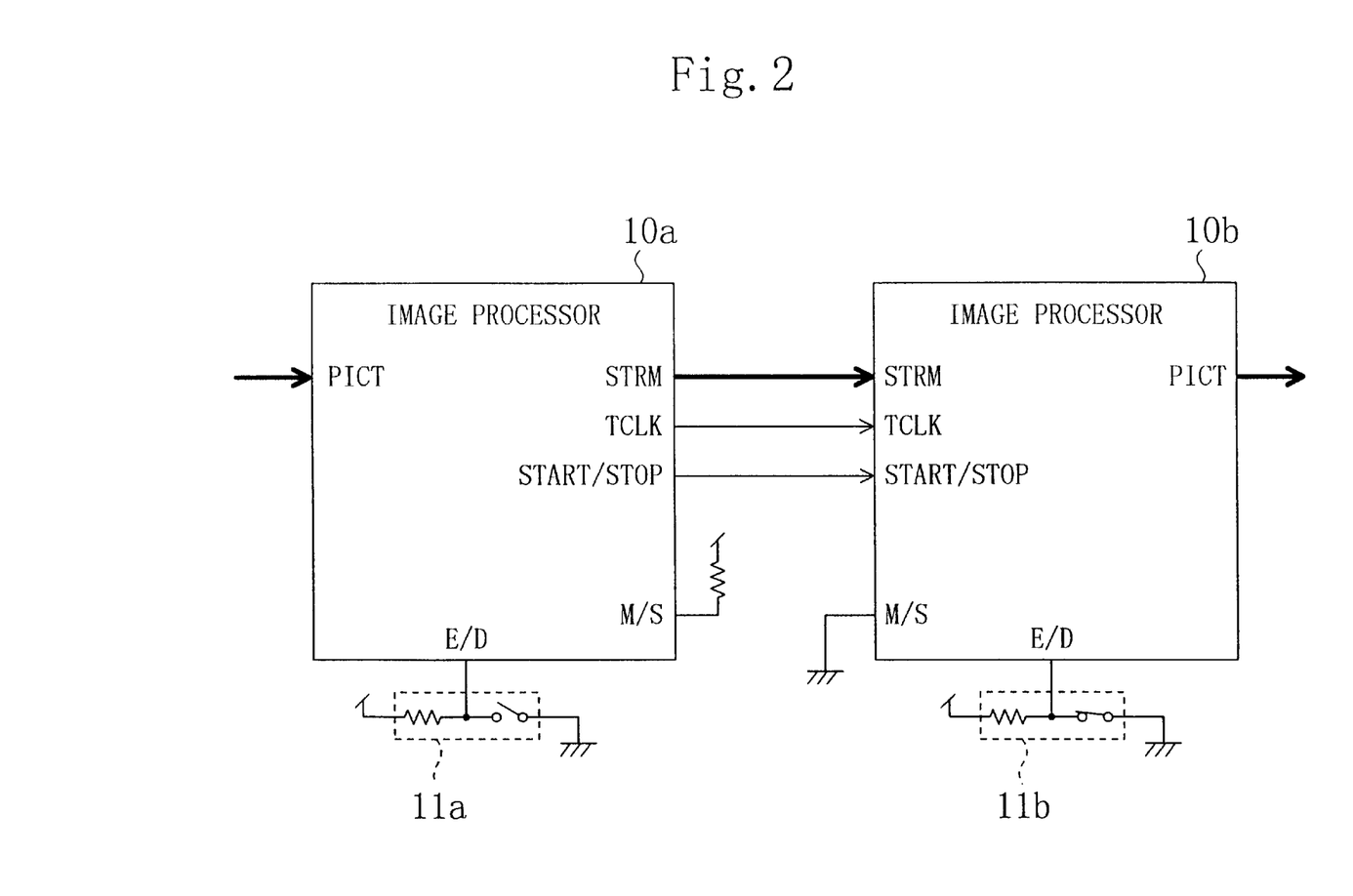
FIG. 2 is a block diagram of an image processing system utilizing the structure as illustrated in FIG. 1.

FIG. 2 shows an image processing system making utilization of the structure as illustrated in FIG. 1. Referring to FIG. 2, a first image processor 10a and a second image processor 10b are directly coupled together. Each of the image processors 10a and 10b is identical in internal structure with the image processor 10 as illustrated in FIG. 1. In the first image processor 10a, a master encoder configuration is chosen, for an input terminal, at which SET SIGNAL MIS is applied, is pulled up and SWITCH SIGNAL E/D at the level of HIGH is applied from a switch circuit 11a. On the other hand, in the second image processor 10b, a slave decoder configuration is chosen, for an input terminal, at which SET SIGNAL M/S is applied, is pulled down and SWITCH SIGNAL E/D at the level of LOW is applied from a switch circuit 11b.

The structure, as illustrated in FIG. 2, enables the entire image processing system to synchronously operate by the first image processor 10a becoming a master encoder, without providing a system controller.

Figure 3:
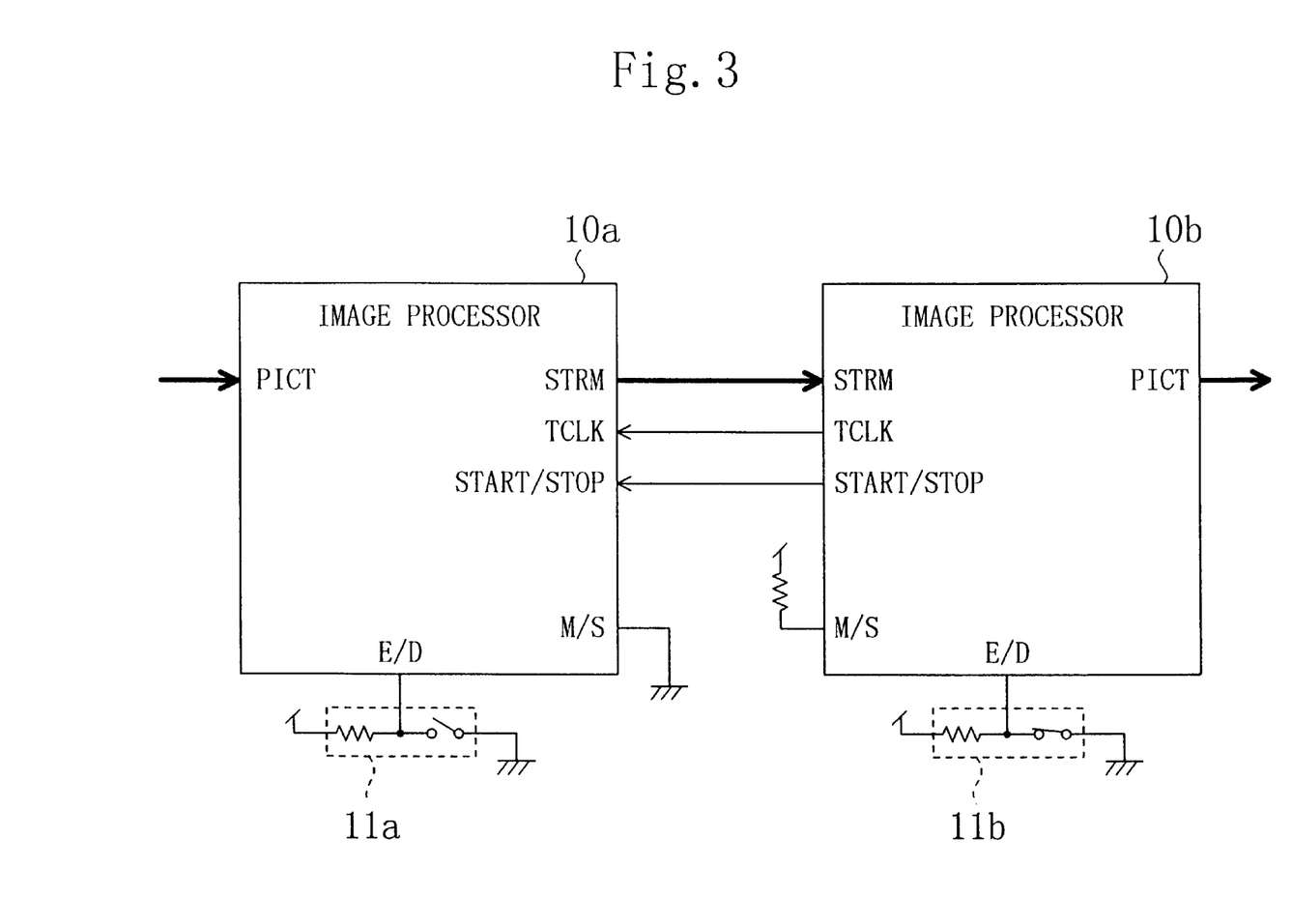
FIG. 3 is a block diagram of another image processing system utilizing the structure as illustrated in FIG. 1.

FIG. 3 shows another image processing system making utilization of the structure as illustrated in FIG. 1. In FIG. 3, a first image processor 10a and a second image processor 10b are directly coupled together. In the first image processor 10a, a slave encoder configuration is chosen, for an input terminal, at which SET SIGNAL M/S is applied, is pulled down and SWITCH SIGNAL E/D at the level of HIGH is applied from a switch circuit 11a. On the other hand, in the second image processor 10b, a master decoder configuration is chosen, for an input terminal, at which SET SIGNAL M/S is applied, is pulled up and SWITCH SIGNAL E/D at the level of LOW is applied from a switch circuit 11b.

The structure of FIG. 3 also enables the entire image processing system to synchronously operate by the second image processor 10b becoming a master decoder. Additionally, a variation to the above can be made to achieve handshaking of these two processors if the second image processor 10b as a master decoder sends CLOCK SIGNAL TCLK and the first image processor 10a as a slave encoder sends TIMING SIGNAL START/STOP.

Figure 4:
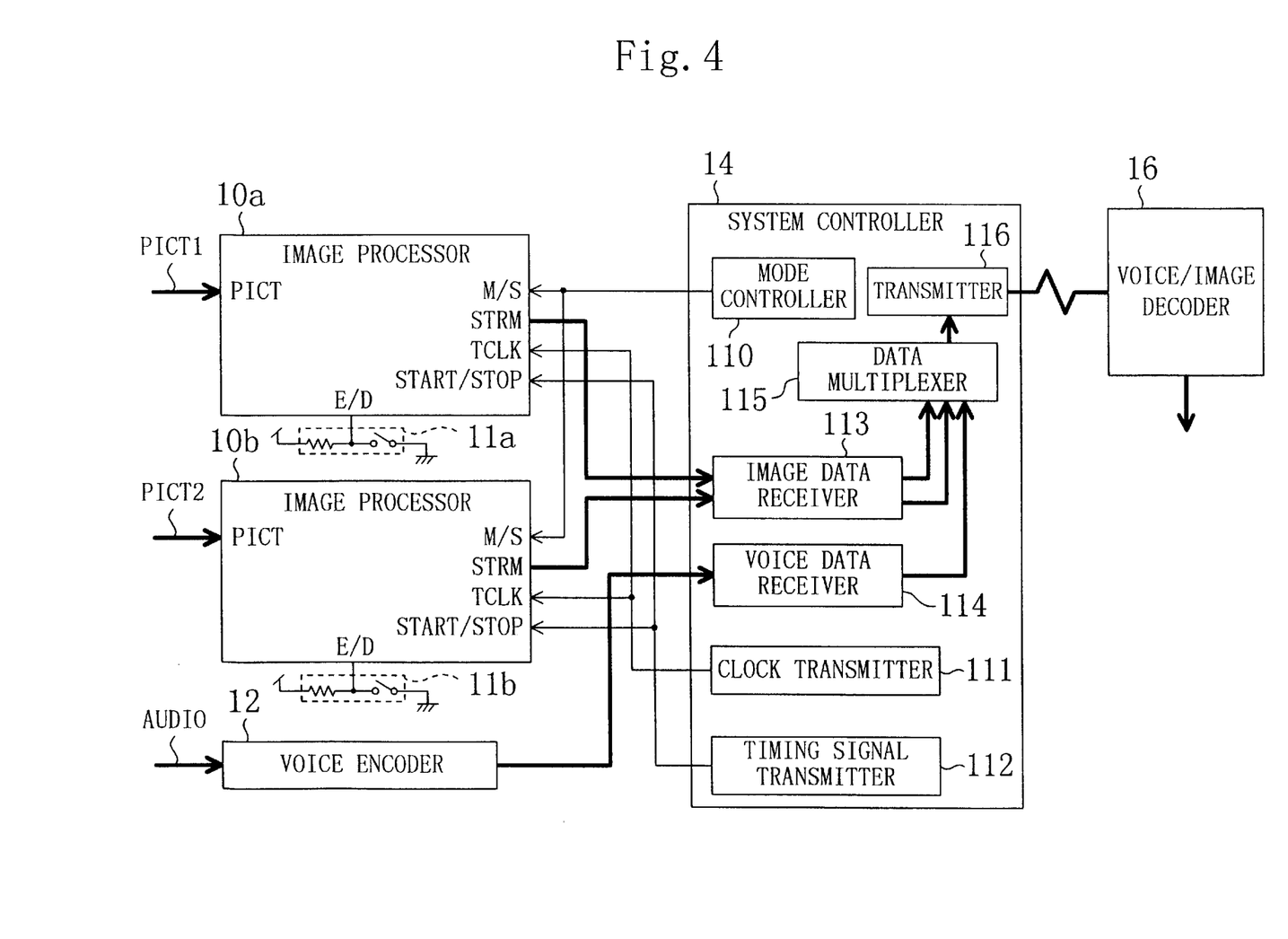
FIG. 4 is a block diagram of a voice/image processing system utilizing the structure as illustrated in FIG. 1.

FIG. 4 shows a voice/image processing system making utilization of the structure as illustrated in FIG. 1. The system of FIG. 4 comprises a first image processor 10a, a second image processor 10b, a voice encoder 12, a system controller 14, and a voice/image decoder 16. The system controller 14 has a mode controller 110 for supplying SET SIGNAL M/S at the level of LOW. Each of the first and second image processors 10a and 10b is identical in internal structure with the image processor 10 as shown in FIG. 1. In the first image processor 10a, a slave encoder configuration is chosen, for SET SIGNAL M/S at the level of LOW is supplied from the system controller 14 and SWITCH SIGNAL E/D at the level of HIGH is applied from a switch circuit 11a. Also in the second image processor 10b, a slave encoder configuration is likewise chosen. The system controller 14 further includes a clock transmitter 111 for supplying CLOCK SIGNAL TCLK, a timing signal transmitter 112 for supplying TIMING SIGNAL START/STOP, an image data receiver 113 for receiving from each of the image processors 10a and 10b BITSTREAM STRM (i.e., encoded image data), a voice data receiver 114 for receiving from the voice encoder 12 encoded voice data, a data multiplexer 115 for generating voice/image data multiplexed in packet units, and a transmitter 116 for sending multiplexed data to the voice/image decoder 16.

Here, the communication rate of a transmission path between the system controller 14 and the voice/image decoder 16 is 192 kbps, image encoded data of the first image processor 10a is assigned 128 kbps, and voice encoded data of the voice encoder 12 is assigned 64 kbps. The clock transmitter 111 supplies CLOCK SIGNAL TCLK at a frequency of 128 kHz (cycle period: about 7.81 μs) at a duty ratio of 50%. The first image processor 10a encodes an analog video signal PICT1. The voice encoder 12 encodes an analog voice signal AUDIO. Referring to FIG. 1, in the first image processor 10a the clock transmitter-receiver 211 supplies to the clock rate detector 212 CLOCK SIGNAL TCLK supplied from the system controller 14. The clock rate detector 212 detects the frequency of the CLOCK SIGNAL TCLK received from the clock transmitter-receiver 211 by the use of CLOCK SIGNAL ICLK at, for example, a frequency of 20 MHz (cycle period: about 50 ns). More specifically, the clock rate detector 212 counts the number of pulses of CLOCK SIGNAL ICLK for the HIGH period of CLOCK SIGNAL TCLK (i.e., for a period of time during which CLOCK SIGNAL TCLK is HIGH). In the present embodiment, the HIGH period of CLOCK SIGNAL TCLK is about 3.91 ps and the clock rate detector 212 detects the number of pulses of CLOCK SIGNAL ICLK at about 78. The frequency of CLOCK SIGNAL TCLK is therefore detected to be 128 kHz. According to the detected frequency, the encode rate controller 213 controls the amount of encoded data that are produced by encoding in the processing unit 101. Accordingly, it is controlled such that image encoded data are supplied from the first image processor 10a to the system controller 14 at 128 kbps.

Image encoded data of the first image processor 10a, image encoded data of the second image processor 10b, and voice encoded data of the voice encoder 12 can be transmitted at 64 kbps, respectively. In this case, the frequency of CLOCK SIGNAL TCLK supplied from the clock transmitter 111 is changed to 64 kHz (cycle period: about 15.62 ps). The first image processor 10a encodes VIDEO SIGNAL PICT1. The second image processor 10b encodes VIDEO SIGNAL PICT2. The voice encoder 12 encodes VOICE SIGNAL AUDIO. In the first image processor 10a, the clock rate detector 212 counts the number of pulses of CLOCK SIGNAL ICLK for the HIGH period of CLOCK SIGNAL TCLK. In the present embodiment, the HIGH period of CLOCK SIGNAL TCLK is about 7.81 μs and the clock rate detector 212 detects the number of pulses of CLOCK SIGNAL ICLK at about 156. The frequency of CLOCK SIGNAL TCLK is detected to be 64 kHz. Accordingly, image encoded data are supplied from the first image processor 10a to the system controller 14 at 64 kbps. Likewise, image encoded data are supplied from the second image processor 10b at 64 kbps.

As described above, in accordance with the structure of FIG. 4, the first and second image processors 10a and 10b become slave encoders thereby allowing the entire processing system to synchronously operate under control of the system controller 14. Additionally, the encode rate of images can be controlled according to the communication rate of a transmission path. The numbers of image processors, voice encoders, and voice/image decoders are not limited to the above-described settings.

Figure 5:
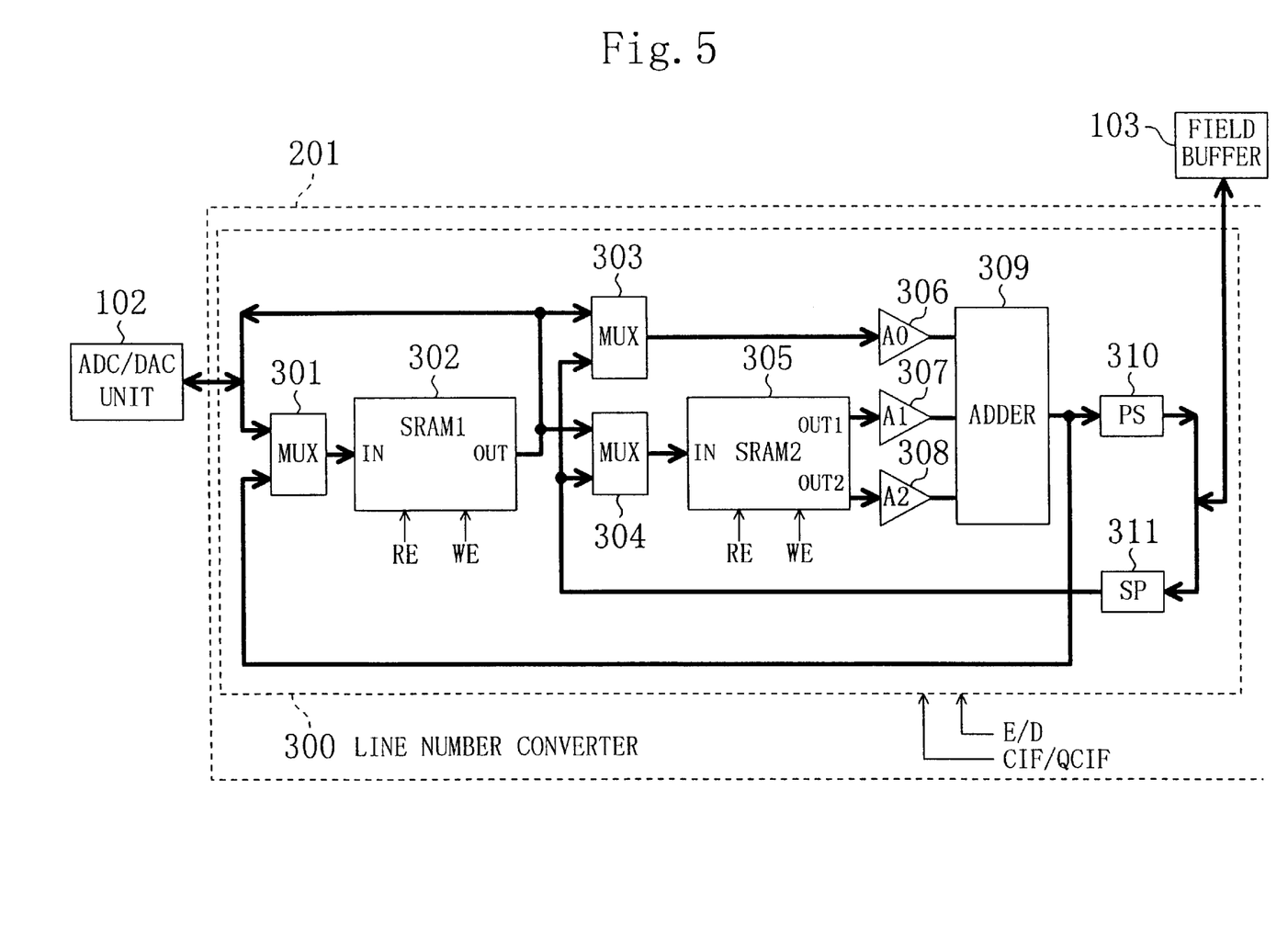
FIG. 5 is a block diagram showing in detail an example of the structure of a part of a first data transmission controller as illustrated in FIG. 1.

FIG. 5 shows in detail an example of the structure of a part of the first data transmission controller 201 as illustrated in FIG. 1. A line number converter 300 of FIG. 5 has a function of performing, as a pre-process, a line number conversion process on image data supplied from the conversion unit 102 and of supplying the pre-processed image data to the field buffer 103 when the image processor 10 of FIG. 1 becomes an encoder and a function of performing, as a post-process, a line number conversion process on image data supplied from the field buffer 103 and of supplying the post-processed image data to the conversion unit 102 when the image processor 10 of FIG. 1 becomes a decoder. The line number converter 300 comprises a first multiplexer 301, a first SRAM 302, as a first memory, which is read at a read rate different from a write rate, a second multiplexer 303, a third multiplexer 304, a second SRAM 305, as a second memory, which functions as a delay line memory, three coefficient multipliers 306–308, an adder 309, a PS (parallel-to-serial) converter 310 for converting a 16-bit word into two 8-bit words, and an SP (serial-to-parallel) converter 311 for converting two 8-bit words into a 16-bit word.

One frame of image, specified by an NTSC (National Television System Committee) video signal that is an analog video signal, is constructed of odd-numbered fields and even-numbered fields. Each field is composed of 720×240 pixels. In this case, the sampling frequency of the conversion unit 102 is 13.5 MHz. Meanwhile, for convenience of the processing unit 101, CIF or QCIF images are held in the field buffer 103. The process frequency of the processing unit 101 is, for example, 27 MHz.

The line number converter 300 of FIG. 5 has a function of 5:6 upscaling 240 lines of an NTSC image to 288 lines of a CIF image, of 5:3 downscaling 240 liens of an NTSC image to 144 lines of a QCIF image, of 6:5 downscaling 288 lines of a CIF image to 240 lines of an NTSC image, and of upscaling 144 liens of a QCIF image to 240 lines of an NTSC image. Here, upsampling and downsampling in horizontal direction of images are not described. The operation of the processing unit 101 can be designed such that CIF images are always held in the field buffer 103 when the image processor 10 of FIG. 1 becomes a decoder.

Figure 6A:
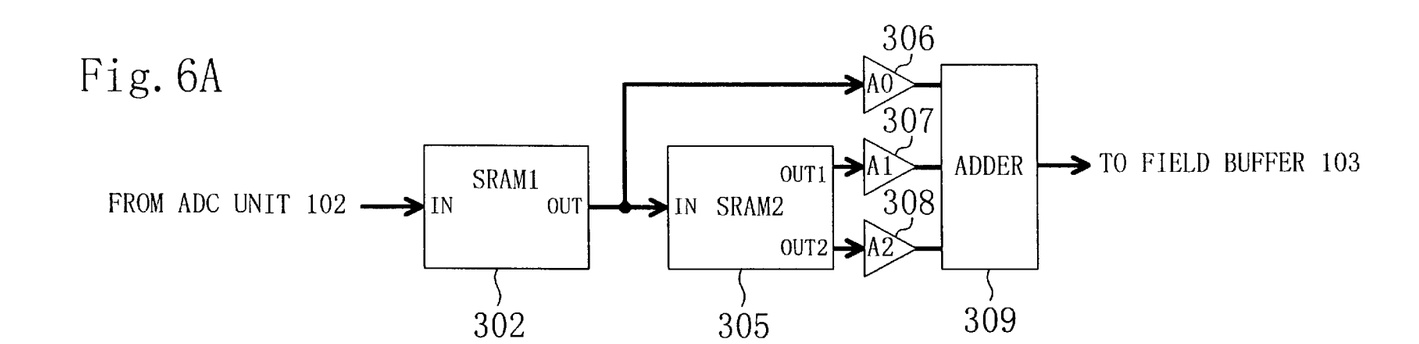
Figure 6B:
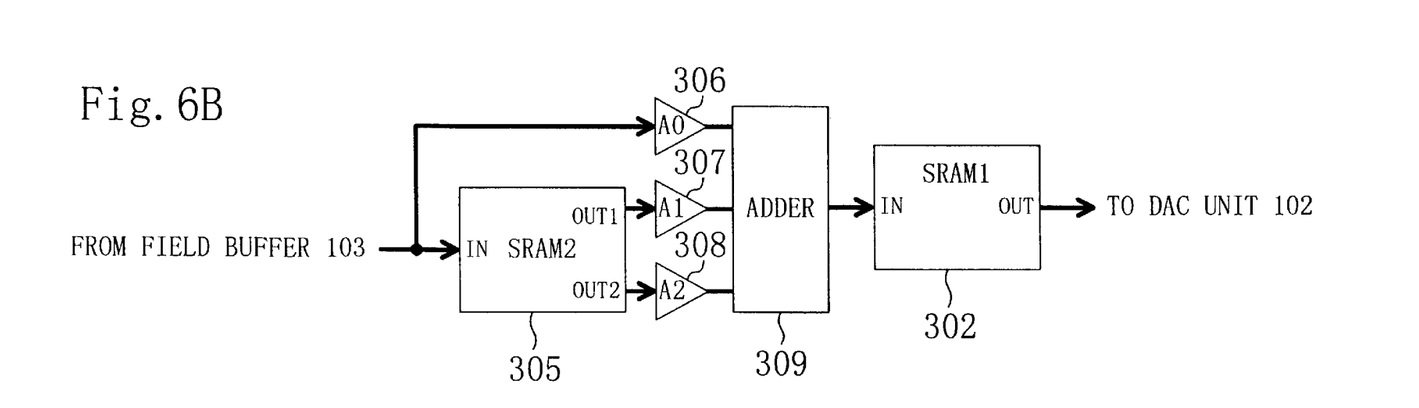

FIG. 6A shows a configuration of the line number converter 300 for an encoder. FIG. 6B shows a configuration of the line number converter 300 for a decoder. By virtue of the operation of each of the multiplexer 301, 303, and 304 of FIG. 5, the second SRAM 305 is connected in back of the first SRAM 302 for the encoder configuration and the second SRAM 305 is connected in front of the first SRAM 302 for the decoder configuration. For the case of CIF images, the multipliers 306 and 307 operate. On the other hand, for the case of QCIF images, the multipliers 306–308 operate.

Figure 7:
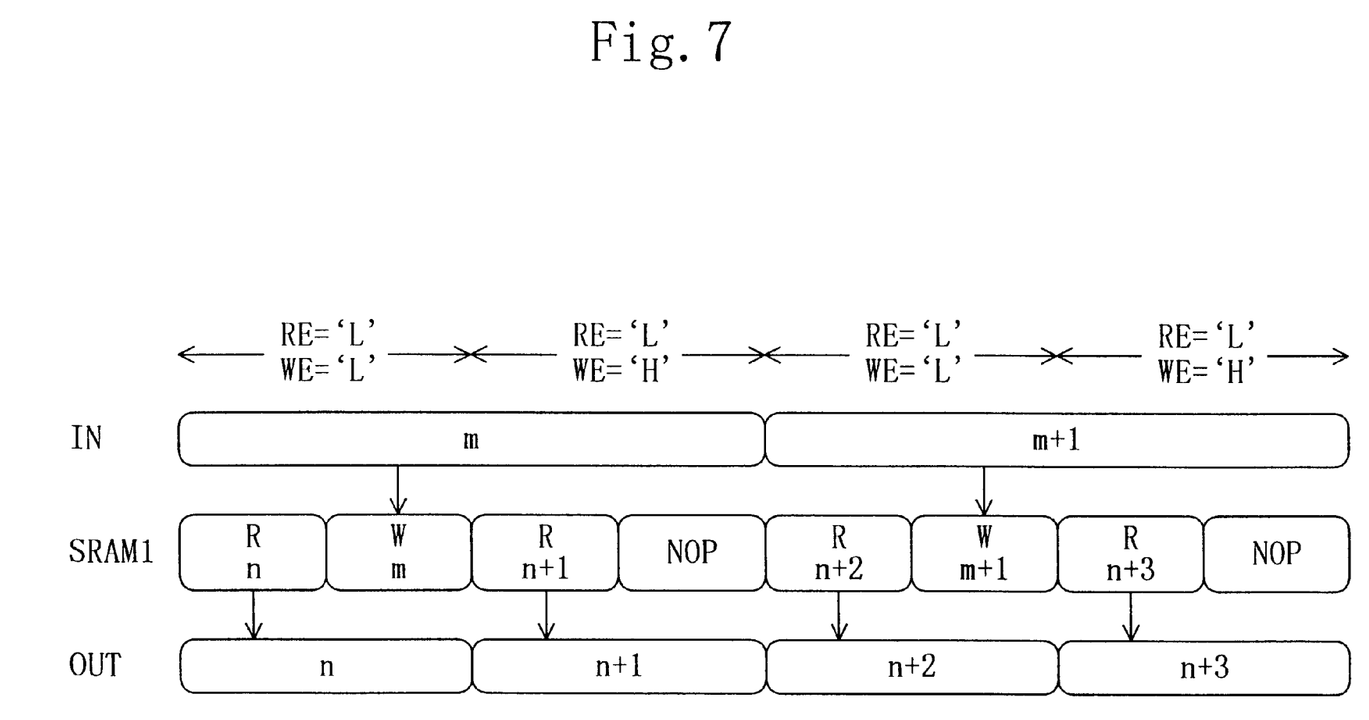
FIG. 7 is a timing chart diagram showing the operation of a first memory in the encoder configuration as illustrated in FIG. 6A.

FIG. 7 shows the operation of the first SRAM 302 in the encoder configuration as illustrated in FIG. 6A. Referring to FIG. 7, the first SRAM 302 is read at a read rate twice a write rate under control of a read enable signal RE and a write enable signal WE. Accordingly, it is possible to read 2-line data (2H) from the first SRAM 302 within a 1-line (1H) period. In the figure, m and n each represent an address.

Figure 8:
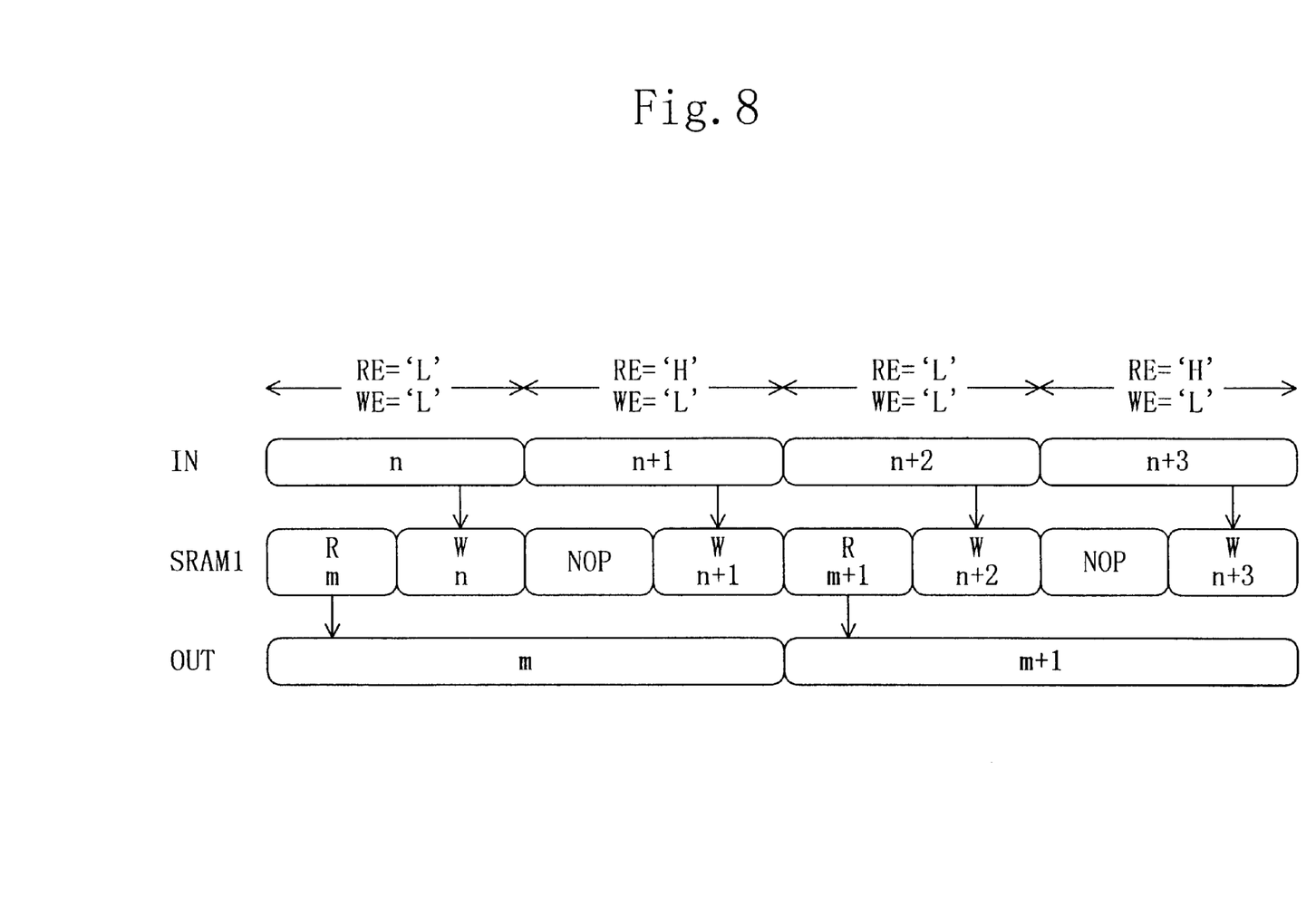
FIG. 8 is a timing chart diagram showing the operation of the first memory in the decoder configuration as illustrated in FIG. 6B.

FIG. 8 shows the operation of the first SRAM 302 in the decoder configuration as illustrated in FIG. 6B. Referring to FIG. 8, the first SRAM 302 is read at a rate that is ½ of a write rate under control of ENABLE SIGNALS RE and WE. In other words, it is possible for the first SRAM 302 to output data which have been written into the first SRAM 302 in half of the 1-line (1H) period, taking a 1-line (1H) period of time.

Figure 9:
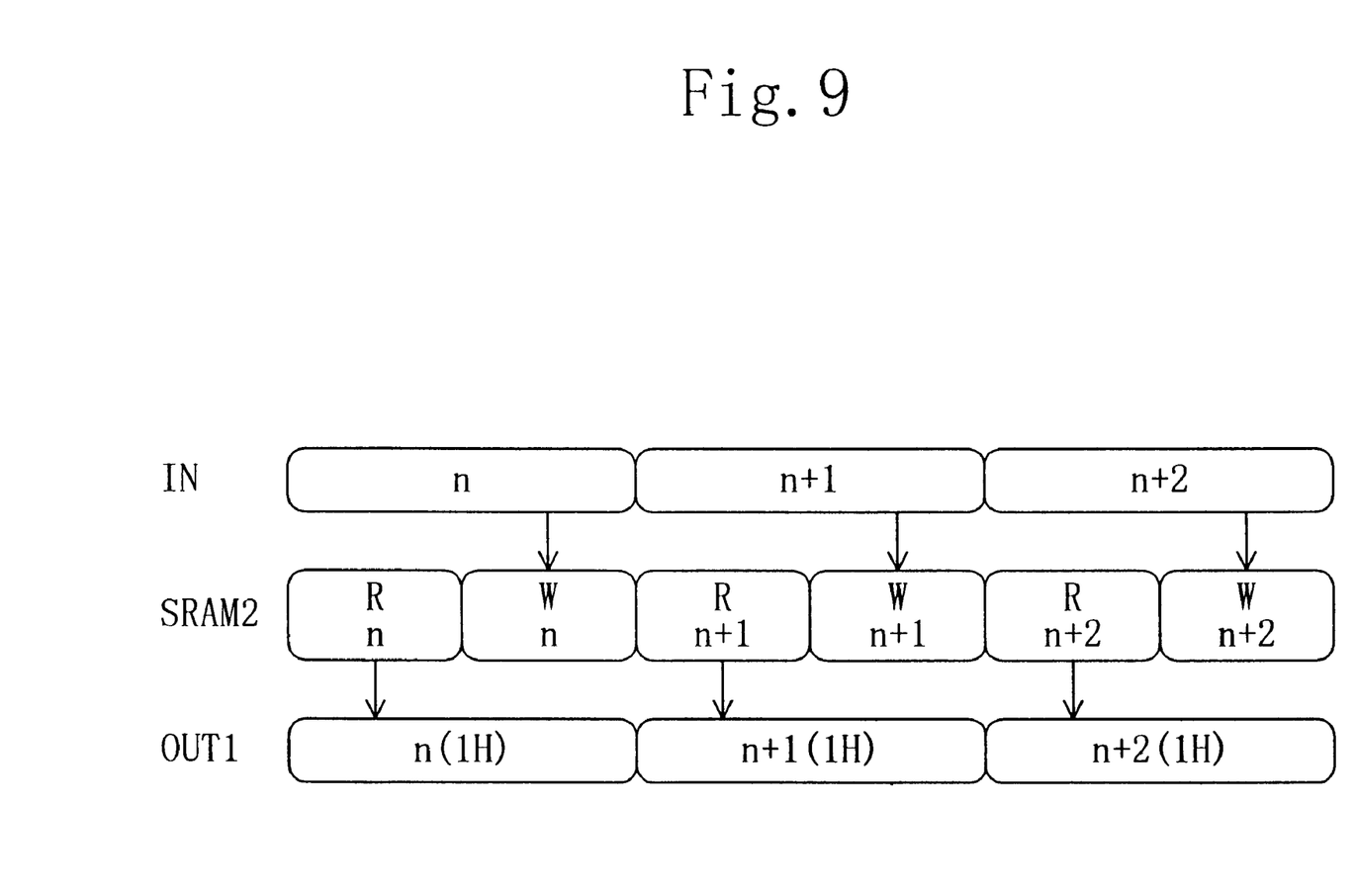

FIG. 9 is a diagram showing the operations of the second SRAM 305 in the encoder and decoder configurations and shows a case of dealing with CIF images. Referring to FIG. 9, the second SRAM 305 constitutes a 1-line (1H) delay memory.

Figure 10:
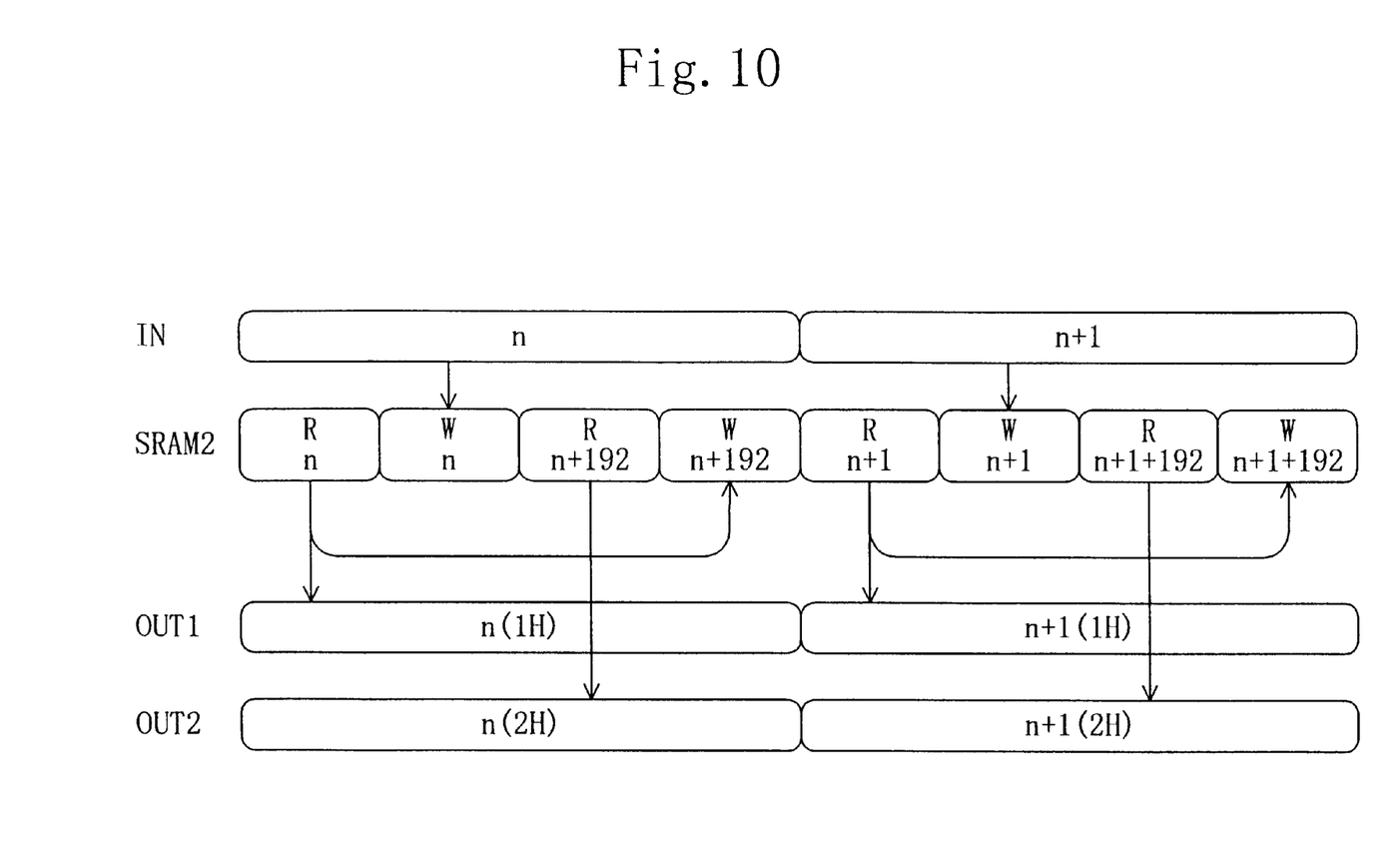

FIG. 10 is a diagram showing the operations of the second SRAM 305 in the encoder and decoder configurations and shows a case of dealing with QCIF images. Referring to FIG. 10, the second SRAM 305 is controlled as follows. Firstly, data at an address n is read. Secondly, different data is written to at the address n. Thirdly, data at an address n+192 located one line away from the address n is read. Finally, the lately-read data is written to at the address n+192. This allows the second SRAM 305 to function as a 1-line (1H) delay memory and as a 2-line (2H) delay memory. The foregoing address displacement value of 192 shows an exemplary 1-line storage capacity of the second SRAM 305 and can be changed according to the structure of the second SRAM 305. However, the displacement value should exceed a value of 176 that is the number of pixels of a QCIF image in horizontal direction.

As describe above, in accordance with the structure as illustrated in FIG. 5, required line-number conversion can be realized while the same hardware resource is shared between encoding and decoding.

Figure 11:
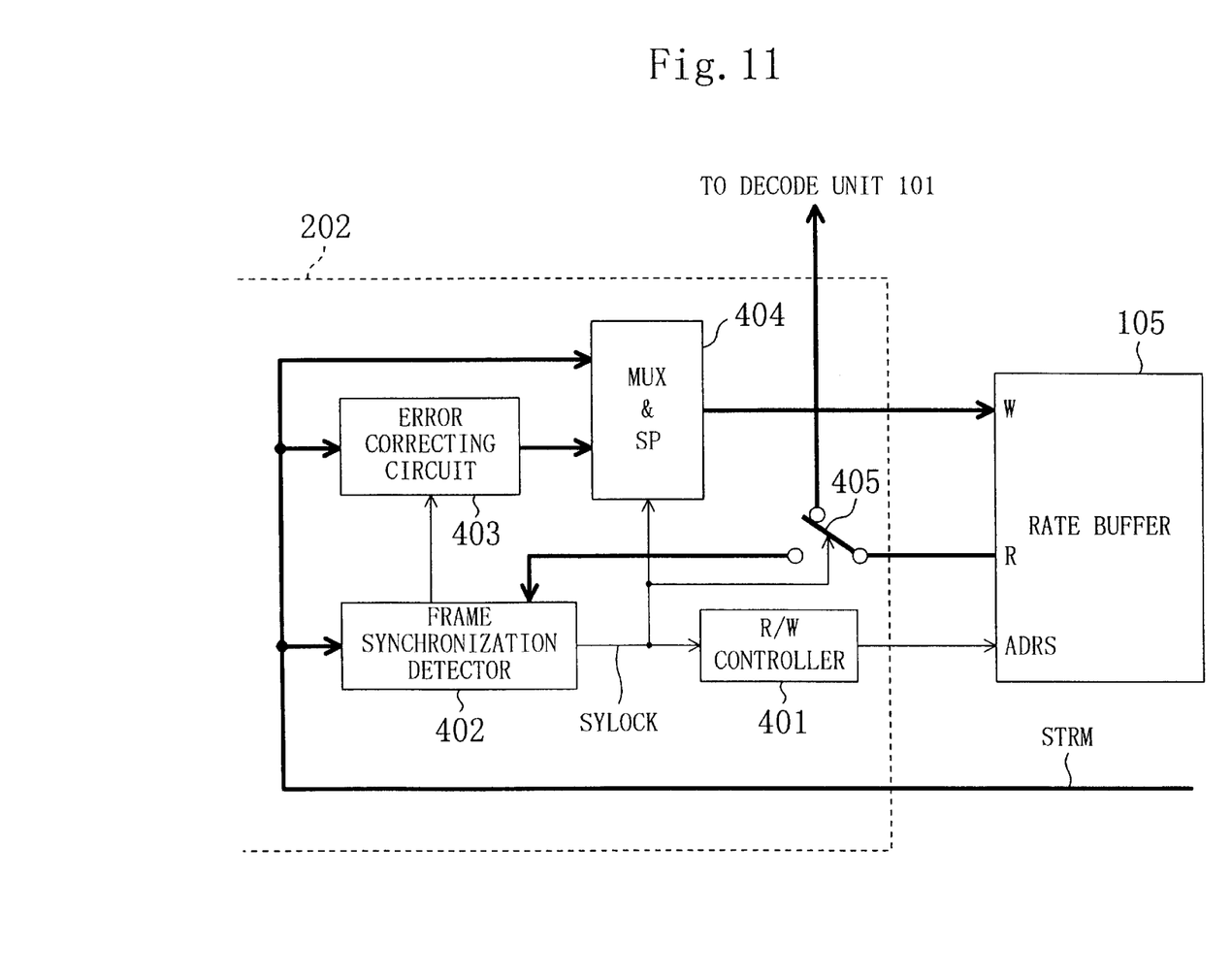
FIG. 11 is a block diagram showing in detail an example of the structure of a part of a second data transmission controller as illustrated in FIG. 1.

FIG. 11 is a block diagram showing in detail an example of the structure of a part of the second data transmission controller 202 as illustrated in FIG. 1 relating to a decoder configuration. Referring to FIG. 11, the second data transmission controller 202 comprises a read/write (R/W) controller 401 for supplying addresses to the rate buffer 105, a frame synchronization detector 402 for detecting whether synchronization is established by conducting a check in synchronization pattern of a newly-input bitstream (STRM) against encoded data temporarily held in the rate buffer 105 and for detecting frame-synchronization deviation on the basis of the input bitstream STRM after frame synchronization is established, an error correcting circuit 403 for performing BCH error correction on an input bitstream (STRM), a multiplexer 404 (MUX&SP) for supplying to the rate buffer 105 an input bitstream (STRM) prior to error correction by the error correcting circuit 403 unless frame synchronization is established and for supplying to the rate buffer 105 results of the error correction by the error correcting circuit 403 during the period in which frame synchronization is established, and a switch 405 for supplying to the frame synchronization detector 402 encoded data read from the rate buffer 105 unless frame synchronization is established and for supplying to the processing unit 101 encoded data read from the rate buffer 105 during the period in which frame synchronization is established. Establishment of a frame synchronization is communicated by a synchronization establishment signal SYLOCK from the frame synchronization detector 402 to the R/W controller 401, to the multiplexer 404, and to the switch 405. At this time, the result of the error correcting circuit 403 becomes valid. The multiplexer 404 further has a function of converting BITSTREAM STRM before or after error correction into 8-bit words.

In accordance with the structure as illustrated in FIG. 11, the rate buffer 105 can be shared between temporal storage of BITSTREAM STRM for frame synchronization detection and temporal storage of results of the error correction that is a target for decoding.

The data transmission control unit 106 and the process control unit 107 of FIG. 1 can be constructed of a single reconfigurable FPGA (field programmable gate array). The internal configuration of the FPGA is changed according to circuit information stored in, for example, EPROM (electrically programmable read-only memory).

In the embodiment shown in FIG. 1, the switch circuit 11, disposed externally to the image processor 10, supplies SWITCH SIGNAL E/D to the mode control unit 108. A variation can be made in which a register, built in the image processor 10, supplies SWITCH SIGNAL E/D to the mode control unit 108. Signals held in the register are set by, for example, a system controller.

What is claimed is:

1. An image processor operable as an encoder for the process of image encoding or a decoder for the process of image decoding, said image processor comprising:

(a) a conversion unit having a function of converting a given analog video signal into digital image data and of converting digital image data into an analog video signal;

(b) a first buffer memory for temporarily holding either image data produced by conversion of an analog video signal by said conversion unit or image data to be converted into an analog video signal by said conversion unit;

(c) a data memory for storing either image data to be encoded or image data produced by decoding;

(d) a processing unit having a first function of reading image data from said data memory and of encoding said image data and a second function of decoding given encoded data and of writing image data produced by said function of decoding into said data memory;

(e) a second buffer memory for temporarily holding either encoded data produced by encoding by said processing unit or encoded data supplied from outside;

(f) a data transmission control unit for controlling the transmission of image data between said conversion unit and said first buffer memory, the transmission of image data between said first buffer memory and said data memory, the transmission of encoded data between said processing unit and said second buffer memory, and the input/output of encoded data of said second buffer memory;

(g) a mode control unit for changing, in response to a given switch signal, the function of said data transmission control unit in order to switch the flow direction of each of said image data and said encoded data and for specifying the function of each of said conversion unit and said processing unit; and a clock transmitter-receiver having a master function of sending a transmission clock signal so that an external device can input encoded data output from said second buffer memory synchronously with said sent transmission clock signal when said image processor becomes an encoder and of sending a transmission clock signal so that an external device can output encoded data to be entered into said second buffer memory synchronously with said sent transmission clock signal when said image processor becomes a decoder, and a slave function of accepting a transmission clock signal supplied from an external device and of supplying said accepted transmission clock signal to said data transmission control unit so that the input/output of encoded data of said second buffer memory can be carried out synchronously with said accepted transmission clock signal;

wherein said mode control unit further has a function of changing the function of said clock transmitter-receiver in response to a given set signal.

2. The image processor of claim 1 further comprising:

a clock rate detector for detecting the frequency of a transmission clock signal received by said clock transmitter-receiver; and an encode rate controller for controlling the amount of encoded data that are produced by an encoding process in said processing unit according to a frequency detected by said clock rate detector.

3. The image processor of claim 2, wherein said clock rate detector detects a transmission clock signal's frequency by the use of an internal clock signal of said image processor.

4. An image processor operable as an encoder for the process of image encoding or a decoder for the process of image decoding, said image processor comprising:

(a) a conversion unit having a function of converting a given analog video signal into digital image data and of converting digital image data into an analog video signal;

(b) a first buffer memory for temporarily holding either image data produced by conversion of an analog video signal by said conversion unit or image data to be converted into an analog video signal by said conversion unit;

(c) a data memory for storing either image data to be encoded or image data produced by decoding;

(d) a processing unit having a first function of reading image data from said data memory and of encoding said image data and a second function of decoding given encoded data and of writing image data produced by said function of decoding into said data memory;

(e) a second buffer memory for temporarily holding either encoded data produced by encoding by said processing unit or encoded data supplied from outside;

(f) a data transmission control unit for controlling the transmission of image data between said conversion unit and said first buffer memory, the transmission of image data between said first buffer memory and said data memory, the transmission of encoded data between said processing unit and said second buffer memory, and the input/output of encoded data of said second buffer memory;

(g) a mode control unit for changing, in response to a given switch signal, the function of said data transmission control unit in order to switch the flow direction of each of said image data and said encoded data and for specifying the function of each of said conversion unit and said processing unit; and a timing controller having a transmission function of sending a timing signal so that an external device can be informed of the start or stop of an encoding process in said processing unit when said image processor becomes an encoder and of sending a timing signal so that an external device can start or stop an encoding process when said image processor becomes a decoder, and a receiving function of accepting a timing signal supplied from an external device and of supplying said accepted timing signal to said processing unit so that said processing unit can start or stop an encoding process or decoding process;

wherein said mode control unit further has a function to change the function of said timing controller in response to a given set signal.

5. An image processor operable as an encoder for the process of image encoding or a decoder for the process of image decoding, said image processor comprising:

(a) a conversion unit having a function of converting a given analog video signal into digital image data and of converting digital image data into an analog video signal;

(b) a first buffer memory for temporarily holding either image data produced by conversion of an analog video signal by said conversion unit or image data to be converted into an analog video signal by said conversion unit;

(c) a data memory for storing either image data to be encoded or image data produced by decoding;

(d) a processing unit having a first function of reading image data from said data memory and of encoding said image data and a second function of decoding given encoded data and of writing image data produced by said function of decoding into said data memory;

(e) a second buffer memory for temporarily holding either encoded data produced by encoding by said processing unit or encoded data supplied from outside;

(f) a data transmission control unit for controlling the transmission of image data between said conversion unit and said first buffer memory, the transmission of image data between said first buffer memory and said data memory, the transmission of encoded data between said processing unit and said second buffer memory, and the input/output of encoded data of said second buffer memory; and (g) a mode control unit for changing, in response to a given switch signal, the function of said data transmission control unit in order to switch the flow direction of each of said image data and said encoded data and for specifying the function of each of said conversion unit and said processing unit, wherein said data transmission control unit includes a line number converter having a first function of performing a line number conversion process, as a pre-process, on image data supplied from said conversion unit and of supplying pre-processed image data to said first buffer memory when said image processor becomes an encoder, and a second function of performing a line number conversion process, as a post-process, on image data supplied from said first buffer memory and of supplying post-processed image data to said conversion unit when said image processor becomes a decoder;

said line number converter including:
a first memory which is read at a read rate different from a write rate; and
a second memory which functions as a delay line memory that can be connected either in front of or in back of said first memory.

6. The image processor of claim 5, wherein said first memory is controlled such that said first memory is read at a read rate twice a write rate when said image processor, becomes an encoder and said first memory is read at half of a write rate when said image processor becomes a decoder.

7. The image processor of claim 5, wherein said second memory is controlled such that data at a first address of said second memory is read, different data is written into at said first address, data at a second address located one line away from said first address is read, and the data read from said first address of said second memory is written in at said second address, in order for said second memory to form a 1-line and a 2-line delay memory.

8. An image processor operable as an encoder for the process of image encoding or a decoder for the process of image decoding, said image processor comprising:

(a) a conversion unit having a function of converting a given analog video signal into digital image data and of converting digital image data into an analog video signal;

(b) a first buffer memory for temporarily holding either image data produced by conversion of an analog video signal by said conversion unit or image data to be converted into an analog video signal by said conversion unit;

(c) a data memory for storing either image data to be encoded or image data produced by decoding;

(d) a processing unit having a first function of reading image data from said data memory and of encoding said image data and a second function of decoding given encoded data and of writing image data produced by said function of decoding into said data memory;

(e) a second buffer memory for temporarily holding either encoded data produced by encoding by said processing unit or encoded data supplied from outside;

(f) a data transmission control unit for controlling the transmission of image data between said conversion unit and said first buffer memory, the transmission of image data between said first buffer memory and said data memory, the transmission of encoded data between said processing unit and said second buffer memory, and the input/output of encoded data of said second buffer memory; and (g) a mode control unit for changing, in response to a given switch signal, the function of said data transmission control unit in order to switch the flow direction of each of said image data and said encoded data and for specifying the function of each of said conversion unit and said processing unit, said data transmission control unit including:

a frame synchronization detector for detecting whether frame synchronization is established by conducting a check in synchronization pattern between new external encoded data and encoded data temporarily stored in said second buffer memory and for detecting frame synchronization deviation on the basis of external encoded data after frame synchronization is established;

an error correcting circuit for performing error correction operations on external encoded data;

a multiplexer for supplying to said second buffer memory encoded data prior to error correction by said error correcting circuit unless frame synchronization is established and for supplying to said second buffer memory results of the error correcting operation by said error correcting circuit during a period in which frame synchronization is established; and a switch for supplying to said frame synchronization detector encoded data read from said second buffer memory unless frame synchronization is established and for supplying to said processing unit encoded data read from said second buffer memory during a period in which frame synchronization is established.

9. An image processor comprising:

(a) a processing unit for encoding image data;

(b) a buffer memory for temporarily holding encoded data produced by an encoding process in said processing unit;

(c) a data transmission control unit for controlling the transmission of encoded data from said processing unit to said buffer memory and the output of encoded data from said buffer memory;

(d) a clock transmitter-receiver having a master function of sending a transmission clock signal so that an external device can input encoded data output from said buffer memory synchronously with said sent transmission clock signal and a slave function of accepting a transmission clock signal supplied from an external device and of supplying said accepted transmission clock signal to said data transmission unit so that encoded data can be output from said buffer memory synchronously with said accepted transmission clock signal; and (e) a mode control unit for changing the function of said clock transmitter-receiver in response to a given set signal.

10. An image processor comprising:

(a) a buffer memory for temporarily holding encoded data supplied from outside;

(b) a processing unit for decoding encoded data delivered from said buffer memory;

(c) a data transmission control unit for controlling the input of encoded data to said buffer memory and the transmission of encoded data from said buffer memory to said processing unit;

(d) a clock transmitter-receiver having a master function of sending a transmission clock signal so that an external device can output encoded data to be entered into said buffer memory synchronously with said sent transmission clock signal, and a slave function of accepting a transmission clock signal supplied from an external device and of sending said accepted transmission clock signal to said data transmission control unit so that encoded data can be entered into said buffer memory synchronously with said sent transmission clock signal; and (e) a mode control unit for changing the function of said clock transmitter-receiver in response to a given set signal.

11. An image processor comprising:

(a) a processing unit for encoding image data;

(b) a timing controller having a transmission function of sending a timing signal so that an external device can be informed of the start or stop of an encoding process in said processing unit and a receiving function of accepting a timing signal supplied from an external device and of sending said accepted timing signal to said processing unit so that said processing unit can start or stop an encoding process; and (c) a mode control unit for changing the function of said timing controller in response to a given set signal.

12. An image processor comprising:
(a) processing unit for decoding encoded data;
(b) a timing controller having a function of sending a timing signal so that an external device can start or stop an encoding process and a function of accepting a timing signal supplied from an external device and of sending said accepted timing signal to said processing unit so that said processing unit can start or stop a decoding process; and
(c) a mode control unit for changing the function of said timing controller in response to a given set signal.

* * * * *